United States Patent [19]

Kösters

[11] 4,210,567

[45] Jul. 1, 1980

[54] PLASTISOL OF AN ACRYLATE POLYMER AND A PLASTICIZER

[75] Inventor: Bernhard Kösters, Heidelberg, Fed. Rep. of Germany

[73] Assignee: Teroson G.m.b.H., Heidelberg, Fed. Rep. of Germany

[21] Appl. No.: 881,745

[22] Filed: Feb. 27, 1978

Related U.S. Application Data

[63] Continuation of Ser. No. 630,271, Nov. 10, 1975, abandoned.

[30] Foreign Application Priority Data

Jul. 3, 1975 [DE] Fed. Rep. of Germany ....... 2529732
Nov. 15, 1974 [DE] Fed. Rep. of Germany ....... 2454235

[51] Int. Cl.$^2$ .................. C08L 33/08; C08L 33/10; C08L 33/12
[52] U.S. Cl. .................. 260/31.8 R; 215/233; 260/29.1 R; 260/30.6 R; 260/31.2 R; 260/31.4 R; 260/31.8 B; 260/31.8 M; 260/33.2 R; 260/33.6 UA; 428/344; 521/73; 521/182
[58] Field of Search .................. 260/29.1 R, 31.8 R, 260/31.8 B, 31.8 M, 30.6 R, 31.2 R, 31.4 R, 33.2 R, 33.6 UA; 428/344; 215/233

[56] References Cited

U.S. PATENT DOCUMENTS

| | | | |
|---|---|---|---|
| 2,413,259 | 12/1946 | Soday | 260/36 |
| 2,558,396 | 6/1951 | Thomas | 260/29.6 |
| 2,600,122 | 6/1952 | Meyer et al. | 260/34.2 |
| 2,773,046 | 12/1956 | Dunn et al. | 260/30.6 |
| 2,860,110 | 11/1958 | Godshalk | 260/17 |
| 2,867,667 | 1/1959 | Dermer et al. | 260/615 |
| 2,872,429 | 2/1959 | Schwartz et al. | 260/30.6 |
| 2,898,318 | 8/1959 | Coffey et al. | 260/31.6 |
| 2,934,509 | 4/1961 | Crissey et al. | 260/30.6 |
| 2,989,492 | 6/1961 | Sanderson | 260/17 |
| 3,010,930 | 11/1961 | Schroeder | 260/31.6 |
| 3,050,412 | 8/1962 | Coe | 117/75 |
| 3,218,287 | 11/1965 | Schmidle et al. | 260/33.6 |
| 3,232,903 | 2/1966 | Schmidle et al. | 260/33.6 |
| 3,261,788 | 7/1966 | Carter et al. | 260/4 |
| 3,365,414 | 1/1968 | Fisk et al. | 260/33.4 |
| 3,405,087 | 10/1968 | Fryd | 260/33.6 |
| 3,415,288 | 12/1968 | Marshak | 138/141 |
| 3,634,299 | 1/1972 | Shim et al. | 260/31.8 |
| 3,666,710 | 5/1972 | Makhlouf et al. | 260/33.6 UA |
| 3,686,111 | 8/1972 | Makhlouf et al. | 260/31.2 |
| 3,699,067 | 10/1972 | Stockman | 260/29.1 SB |
| 3,701,747 | 10/1972 | Osmond | 260/33.6 |
| 3,701,747 | 10/1972 | Osmond et al. | 260/33.6 |
| 3,705,122 | 12/1972 | Gwinner | 260/2.3 X A |
| 3,784,501 | 1/1974 | Pettit | 260/31.6 |
| 3,790,523 | 2/1974 | Orvis | 260/30.6 |
| 3,829,397 | 8/1974 | Sheppard | 260/31.8 M |
| 4,071,653 | 1/1978 | Boessler et al. | 428/332 |

FOREIGN PATENT DOCUMENTS

| | | |
|---|---|---|
| 118967 | 2/1946 | Australia . |
| 287850 | 1/1965 | Australia . |
| 4988 | 11/1967 | Australia . |
| 846793 | 1/1977 | Belgium . |
| 362023 | 11/1936 | Canada . |
| 444273 | 9/1947 | Canada . |
| 615435 | 2/1961 | Canada . |
| 934498 | 9/1955 | Fed. Rep. of Germany . |
| 1808653 | 10/1973 | Fed. Rep. of Germany . |
| 2327958 | 1/1975 | Fed. Rep. of Germany . |
| 2454235 | 12/1976 | Fed. Rep. of Germany . |
| 2543542 | 4/1977 | Fed. Rep. of Germany . |
| 1250419 | 12/1960 | France . |
| 846197 | 9/1958 | United Kingdom . |
| 1012003 | 12/1965 | United Kingdom . |
| 1114142 | 5/1968 | United Kingdom . |
| 1206407 | 9/1970 | United Kingdom . |

OTHER PUBLICATIONS

Acrylic Granules, I.C.I. Technical Data Sheet, AGTD 101, 4th Ed.
∓Ent Sik Lopedia Polimerov," Moscow, "Sovetskaya entsiklopedia," (1974) vol. 2, pp. 540–541.
"Ullmans Enzyklopodie Der Technischen Chemie", (1960), Band 11, Seite 14.
Chemisches Zentrol Blatt, Nos. 20432, 54633.
Plasticizer Technology, vol. 1, pp. 228–242.
Encycl. of Pol. Sci. and Tech., (1966), vol. 4, pp. 730–735.
Acrylharze, Rohm and Haas, Lackrohstoffe, p. 14.
Plastisole und Organosole, Deutsche Farbenzeitschrift, (1965), p. 93.

*Primary Examiner*—Stanford M. Levin

*Attorney, Agent, or Firm*—Lowell H. McCarter; C. Edward Parker

[57] ABSTRACT

Subject of this invention are plastisols based on selected plasticizers and on polymers of certain acrylic or methacrylic monomers, viz. mainly (i) t-butyl acrylate, a $C_{1-4}$ alkyl, especially methyl, acrylate or cyclohexyl methacrylate, and optionally also (ii) one or more comonomers selected from methacrylates of aliphatic $C_2$ to $C_{10}$ alcohols, acrylates of aliphatic $C_1$ to $C_{10}$ alcohols, styrene and alpha-methyl styrene. The glass transition temperature of the polymer is above 35° C., its average degree of polymerization more than 400 and its average particle size in the plastisol is 0.1 to 500 microns.

18 Claims, 1 Drawing Figure

PLASTISOL OF AN ACRYLATE POLYMER AND A PLASTICIZER

Figure 1:
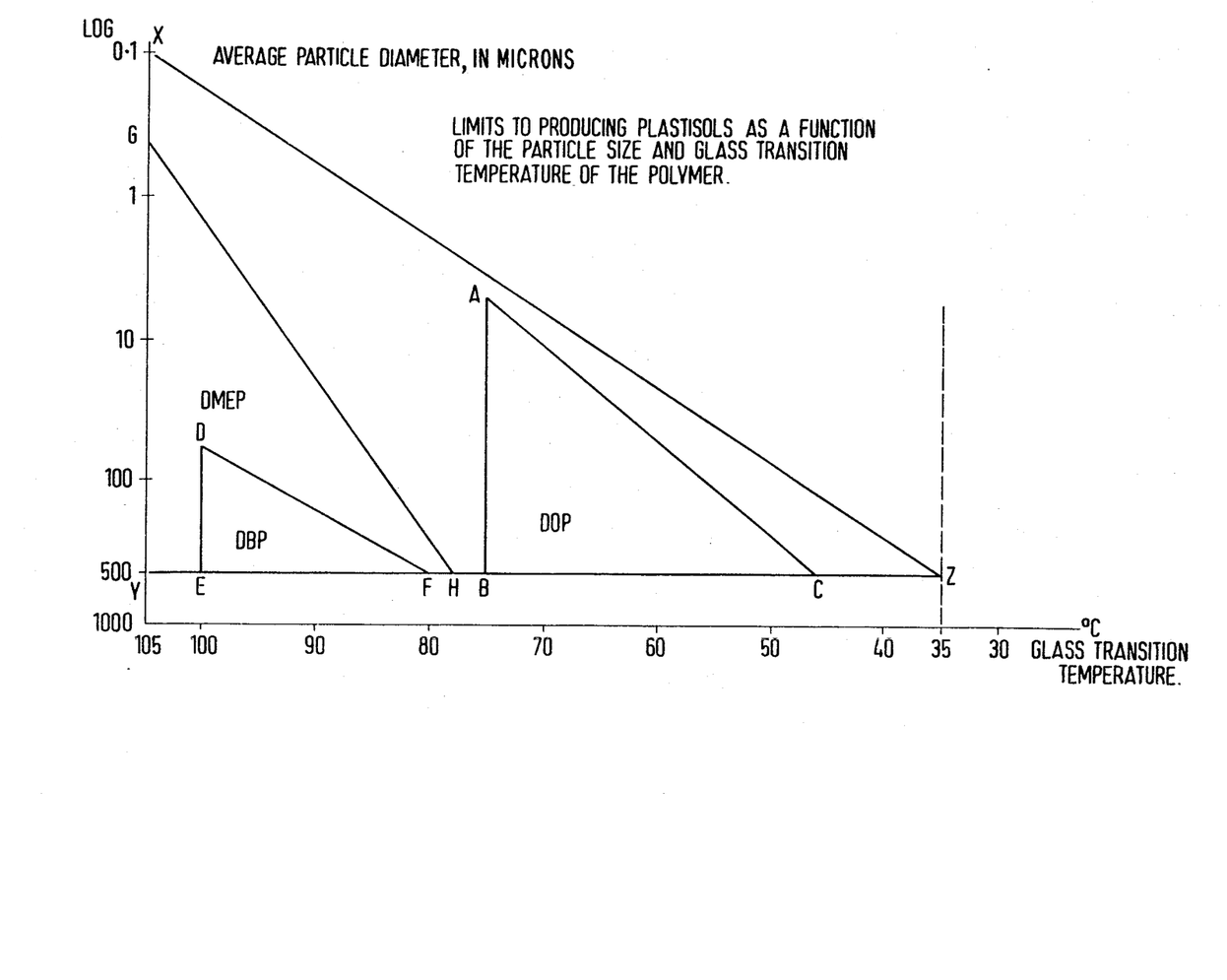

This is a continuation, of application Ser. No. 630,271 filed Nov. 10, 1975, now abandoned.

The invention relates to novel plastisols based on acrylate polymers and organic plasticizers.

Plastisols are generally understood to mean dispersions of organic plastics in plasticizers, which are gelled on heating to an elevated temperature. The presently conventional plastisols generally comprise pulverulent polyvinyl-chloride dispersed in a compatible liquid plasticizer which forms a paste. Polyvinyl-chloride plastisols are used for numerous different purposes, particularly as sealing compounds, as anti-corrosive coatings for metals, for impregnating and coating textile substrates, as cable insulations, etc.

However, several serious problems occur in the production and use of PVC-plastisols. In fact, the production of PVC itself represents a problem because persons working in the production area may be exposed to a health risk by the vinyl chloride. Of late this has led to the closing of a large number of PVC factories. Residual monomer in the PVC could also endanger people during processing, and possibly even the final consumer if the plastigel comes into contact with foodstuffs.

When using PVC-plastisols, it is disadvantageous that PVC is both sensitive to light and heat and tends to split off hydrogen chloride. The splitting off of hydrogen chloride represents a particularly serious problem because during use the plastisol must be heated to an elevated temperature, and any hydrogen chloride liberated under these conditions has a corrosive effect and, for example, corrodes metal substrates. Attempts have been made to counteract thermal decomposition by adding heat stabilizers, but these compounds are frequently toxic so that they cannot be used where the plastisol comes into contact with foodstuffs. The above-indicated problems are further exacerbated in that in certain special cases PVC-plastisols require relatively high baking temperatures in order to obtain very short gelling times so that the danger of PVC-decomposition is further increased.

It is the object of the invention to develop novel plastisols which also have the excellent processing and product characteristics of PVC-plastisols but which gel at lower temperatures and are also chlorine-free so that there can be no splitting off of chlorine or hydrogen chloride. It has surprisingly been found that this problem can be solved in that for the production of the plastisols particular acrylic polymers are used and processed with plasticizers.

According to the present invention a plastisol is provided, in which 100 weight parts of solid particles of an organic polymer component (a) are dispersed in 30 to 1000 weight parts of an organic liquid component (b), which serves as a compatible plasticizer for the organic polymer to form a viscous dispersion having a liquid or paste-like appearance, characterized in that the organic polymer component consists substantially of units derived from (i) one or more of: t-butyl acrylate, a $C_{1-4}$ alkyl methacrylate or cyclohexyl methacrylate, or (ii) one or more of the above monomers and one or more comonomers selected from methacrylates of aliphatic $C_2$ to $C_{10}$ alcohols, acrylates of aliphatic $C_1$-$C_{10}$ alcohols, styrene and alpha-methyl styrene, in that the polymer has a glass transition temperature of above 35° C. and an average degree of polymerization of more than 400, and in that the particle size of the polymer in the plastisol is from 0.1 to 500 microns.

It is disclosed in "Plasticiser Technology", edited by Paul E. Bruins, Reinhold Publishing Corporation, New York, Volume 1 pages 228–241, that various conventional organic plasticizers can be used with acrylic polymers so long as the proportion of plasticizer is small, about 10%. However, the present invention relates exclusively to plastisols, which is a special form of dispersion of polymer in the plasticizer, not mentioned in the above reference. In a plastisol the proportion of plasticizer is inevitably more than 10% and the polymer has to be very finely divided. The plastisol is a viscous liquid or paste at room temperature, and has the property of gelling on heating, so that upon cooling a hardened, homogeneous, elastic solid is obtained.

U.S. Pat. No. 2,413,259 describes the use of certain high-boiling oily liquids as plasticizers for acrylic and methacrylic resins. The mixtures there described are (1) hot-melt mixtures, (2) solutions of the plasticizer and resin in a third substance as solvent and (3) masticated blends prepared on a two-roll mill or Banbury mill (in the manner of compounding rubber). This patent also does not disclose plastisols. The average particle size of the polymer used is preferably increased proportionally with the decrease of its glass transition temperature $T_g$. The glass transition temperature is preferably above 60° C.

To obtain usable results, the degree of polymerization of the polymer used must be at least about 400. Advantageously the degree of polymerization is between 400 and 20,000, corresponding to an average molecular weight of about 40,000 to 2,000,000.

The preferred polymer component consists substantially wholly of one kind of units derived from t-butyl acrylate, methyl, ethyl, n-propyl, isopropyl, n-butyl, sec-butyl or t-butyl methacrylate or cyclohexyl methacrylate, i.e. is essentially a homopolymer. Methyl methacrylate is preferred. The alcohol acrylate or methacrylate comonomers preferably have an alkanol alcohol component, i.e. are unsubstituted and saturated, and the type (i) monomers, i.e. those listed above, will generally predominate over those of type (ii). The preferred copolymers are those in which one of the monomers is methyl methacrylate and constitutes at least 40%, preferably at least 50%, by weight of the total monomer units, and the other component is a $C_{2-4}$ alkyl methacrylate, especially n-butyl methacrylate, or a $C_{1-4}$ alkyl acrylate.

However, within the scope of the present invention only those copolymers can be used whose glass transition or solidification temperature is above about 35° C. The glass transition temperature $T_g$ of a particular copolymer can be calculated beforehand by the Fox formula (T. G. Fox, Bull. Am. Phys. Soc., vol. 1, 123 (1956)):

$$\frac{1}{T_{Co}} = \frac{W_1}{T_1} + \frac{W_2}{T_2} + \ldots \frac{W_n}{T_n}$$

wherein $W_1$ represents the weight portion of monomer 1, $W_2$ the weight portion of monomer 2, $T_1$ the glass transition temperature of the polymerized monomer 1 in °K., $T_2$ the glass transition temperature of the polymerized monomer 2 in °K., $T_{Co}$ the glass transition temperature of the copolymer in °K.

The average particle size of the polymer used must be between about 0.1 microns and 500 microns preferably between 0.3 and 200 microns. If too large a particle size is used, the plastisol obtained will not have an adequate internal bond, and no complete gelling of the polymer occurs. If the particle size is too small, the storage stability is inadequate, i.e. gelling occurs even when the polymer is left to stand.

As will be explained relative to the attached drawing, when using a plastisol there is an interdependence between the average particle size of the polymer used and its glass transition temperature $T_g$. The graph shows the logarithm of the average particle size in microns versus the glass transition temperature $T_g$ in °C. The polymers most suitable for the plastisols according to the invention substantially occur within a triangle formed by the two coordinates as well as the connecting line between the minimum particle size and the minimum glass transition temperature. It can also be seen that the higher the glass transition temperature of the polymer, the lower can be its average particle size. However, extremely fine-grained polymers with a low glass transition temperature are not suitable.

It is also possible within the scope of the present invention to use two polymers having different average particle sizes. As a result of using a mixture of a fine-grained and a coarse-grained polymer, it is possible to control within certain limits the flow characteristics and plasticizer requirements (cf. e.g. German Pat. No. 934,498).

Both suspension-polymerized and emulsion-polymerized acrylic polymers are suitable for the plastisols according to the invention. In the case of suspension-polymerization, the desired particle size can be controlled by the stirring rate, and in the case of emulsion-polymerization by the quantity and type of emulsifier. The particle size of the polymer is determined in conventional manner, e.g. by means of a Coulter counter.

Preferably 65 to 800 parts by weight of plasticizer are used per 100 parts by weight of polymer.

The plasticizer selected must of course be completely compatible with the particular acrylic polymer. A useful simple test of compatibility is that at least 8 days after the gelling of the plastisol, the plasticizer does not exude, as shown by a completely dry and non-tacky surface. Naturally, the compatibility is dependent both on the type of acrylic polymer and on the type of plasticizer. For example, dibutyl-phthalate is not a suitable plasticizer for polymethyl-methacrylate because compatibility is inadequate. However, the same plasticizer can be used for copolymers of methyl-methacrylate and approximately 5 to 25% of butylmethacrylate.

A further important criterion for selecting suitable plasticizers is the storage stability of the plastisol. This can be quantitatively defined by the viscosity number (based e.g. on a 1:1 polymer/plasticizer mixture) in the following manner:

$$V_{8/0} = (\eta_{8d}/\eta_o)$$

wherein $V_{8/0}$ represents the viscosity number, $\eta_o$ the initial viscosity of the plastisol, and $\eta_{8d}$ the plastisol viscosity after standing for 8 days.

The viscosity is determined by means of conventional methods of determination, e.g. with a rotary viscosimeter (Drage). According to the definition indicated hereinbefore, the viscosity number must be below 3.0 for the plasticizers usable according to the invention, i.e. the viscosity may not rise more than three times within a period of 8 days. Such a plasisol would still not necessarily always be adequately stable, but this can easily be remedied, e.g. by increasing the plasticizer content or adding fillers or other additives.

The selection of the most appropriate plasticizer can again be explained relative to the drawing. Within the triangle XYZ which encloses the suitable acrylic polymers, there is a smaller triangle for elach usable plasticizer within which are located those acrylic polymers which can be combined with a particular plasticizer to give a usable plastisol. The zones for the individual plasticizers are limited to the left by the compatibility with the polymer, and upwards (hypotenuse of the triangle) by the viscosity number (storage stability). For each plasticizer these limits can be determined by simple experiments. As examples, the drawings show the zones GYH, DEF and ABC for dimethoxy-ethyl-phthalate (DMEP), dibutyl-phthalate (DBP) and dioctyl-phthalate (DOP).

Plasticizers having at least two aromatic rings and/or two ether groups in the molecule have proved particularly suitable for polymethylmethacrylate homopolymers. The first group includes, for example, butylbenzyl-phthalate, dibenzyl-toluene, dibenzylphthalate, diphenyloctyl-phosphate, triphenyl-phosphate, tricresyl phosphate, dibenzyl-benzoate, and diphenylether. The second group includes, among others, dimethoxy-ethylphthalate, diethoxyethylphthalate, dibutoxyethylphthalate and methylphthalylethyl-glycollate. Both criteria are satisfied by diethyleneglycol-dibenzoate and dipropyleneglycol-dibenzoate. A further preferred plasticizer is acetyl tributyl citrate.

When methacrylic copolymers are used, generally the compatibility with plasticizers increased, but in many cases there is a viscosity number above 3.0, i.e. an inadequate stability. For example, for a copolymer of 15% n-butyl-methacrylate and 85% methylmethacrylate with an average particle size of 100 microns, dibutyl phthalate, diisobutyl phthalate and diamyl phthalate are also suitable in addition to the above-indicated plasticizers. However, if in the case of these polymers the particle size is reduced to 2 microns, the viscosity number for most of the indicated plasticizers rises to above 3.0. However, tricresol phosphate and dibenzyl toluene still remain suitable as plasticizers.

Conventional plasticizers such as dioctyl phthalate, dinonyl phthalate and others require a still higher comonomer content in the copolymer in order to obtain an adequate compatibility.

In the case of a copolymer consisting of 50 parts by weight of butylmethacrylate and 50 parts by weight of methylmethacrylate and having an average particle size of 50 microns, even if the necessary compatibility exists, it is impossible to obtain an adequate storage stability with most of the above-indicated plasticizers. However, dioctyl phthalate, dinonyl phthalate, didecyl phthalate, butyl cyclohexyl phthalate and the like remain suitable as plasticizers in such cases. Thus, with an increasing comonomer content in the polymer, the aliphatic groups in the phthalate may proportionally become longer. While pure aliphatic plasticizers such as adipates or sebacates are unsuitable it is then possible to use higher boiling aromatic hydrocarbons with aliphatic groups. For example, Ingralur 839 (hydrocarbon mixture containing more than 40% aromatics, produced by the Fuchs Company, Mannheim) has proved suitable for the latter copolymers. In the case of a comonomer content of 70% butyl methacrylate very coarse particles are required, but phthalates cannot be used due to the too limited storage stability. Plasticizers such as Ingralur 839, polymerol (naphthenic hydrocarbons produced by Shell) and tri-(ethylhexyl)-mellitate and high-boiling aromatic oils remain suitable.

Many plasticizers which have a good storage stability but poor compatibility with the particular polymers making them unsuitable per se for plastisol formation can, in certain circumstances, be used as so-called extenders to replace up to about 25% by weight of the main plasticizer. These extenders particularly include plasticizers which are alone only compatible in the case of a high comonomer content.

Finally, it is also possible to use so-called polymer plasticizers if they are compatible with the particular acrylic polymer used. In this connection the plastisol viscosity is substantially dependent on the viscosity of the polymer plasticizer, which is always significantly higher than that of the monomeric plasticizers. Suitable polymer plasticizers are e.g. ortho- and para-phthalate-based polyesters.

If different plasticizers can be used for the compounding of a plastisol from a specific acrylic polymer or co-polymer, the choice will ultimately depend on the end use of the plastisol. Thus, polymethyl methacrylate can advantageously be used together with acetyl tributyl citrate for food applications (container gaskets) while other technically feasible plasticizers would not be suitable for this purpose.

In addition to acrylic polymers and plasticizers, the plastisols according to the invention can contain up to 700, preferably up to 400 parts by weight of inert fillers per 100 parts by weight of polymer. The fillers mainly serve to increase the viscosity as well as to improve the abrasion resistance. They also permit a cost saving. Suitable fillers are chalks which can, e.g. be ground, precipitated or coated, barite, kaolin, highly dispersed silica, talc, bentonite, glass powder, sand, aluminium oxide and hydroxide, antimony trioxide, titanium dioxide, carbon black, metal soaps, such as zinc or calcium stearate, dyes, pigments and corrosion inhibitors may also be added to the plastisols.

In addition, the plastisols can contain conventional additives, for example viscosity regulators such as emulsifiers and silicones, further oxidation, light and heat stabilizers, as well as epoxide softeners. It is also possible to add foaming agents, for example azo-compounds which decompose during gelling and lead to a foamed plastigel.

It is finally particularly important to ensure the adhesion of the plastisols according to the invention on the particular substrate to be treated, e.g. steel (greased, de-greased, phosphatized, primed), aluminum, textiles, papers and others. For this purpose are used suitable adhesion promoters such as triethyleneglycol dimethacrylate, trimethylol trimethacrylate combined with peroxides which decompose at the gelling temperature, and initiate a radical polymerisation of the adhesive.

Liquid or solid phenol or resorcinol resins with a low formaldehyde content are also suitable. It is also possible to use epoxide resins with heat-reacting hardeners such as acetoguanamine or dicyano-diamide, as well as amino-silanes. The adhesion promoter content can be 0.1 to 50, preferably 1 to 5 parts by weight to 100 parts by weight of polymer.

The adhesion can also be improved by co-polymerizing a small quantity (based on the polymer and/or co-polymer) of an acrylate or methacrylate monomer with free functional groups or of one or more copolymerizable monomers having a heterocyclic group with at least one nitrogen atom in the ring with the acrylic or methacrylic polymer. The proportion of such comonomers is generally up to about 3% by weight. Acrylate and/or methacrylate monomers with free carboxyl, hydroxyl, epoxy or amino groups are particularly suitable. In particular, it is therefore possible to use free acrylic acid or methacrylic acid as well as esters thereof with lower aliphatic oxy, epoxy or amino alcohols.

Excellent adhesion properties are obtained if the monomers of the polymer are co-polymerized with small amounts of certain heterocyclic compounds. Preferably, a heterocyclic vinyl compound of the general formula is used as a comonomer for the co-polymerization in which n is equal to 0 or 1 and in which $R_1$ is a hydrogen atom, a linear or branched alkyl group with 1 to 4 carbon atoms or a phenyl group while $R_2$ is a group of the formulae —$COR_3$, or —$R_3$ in which $R_3$ is a heterocyclic group having one or several rings with at least one nitrogen atom in the ring.

Preferably, the amount of the heterocyclic compound is about 0.1 to 3%, preferably 0.2 to 3%, by weight (based on the polymer and/or copolymer or monomer/s to be polymerized) since excellent results have been obtained with amounts in this range. Optionally, however, the amount can be increased, e.g. to up to 5% and in special cases even to 10% by weight.

Suitable monomers are, for example N- or C-vinyl or N- or C-allyl compounds of imidazole, imidazoline, imidazolidine, benzimidazole, triazole, pyrrole, pyrazole, oxyzole, pyridine, chinoline, diazine as well as other heterocyclic compounds with at least one nitrogen atom in the ring system. N-vinyl imidazole is particularly preferred. Furthermore, vinyl and allyl ethers and acrylic or methacrylic acid esters of the heterocyclic compounds are useful.

The adhesion properties of the plastisols can be further improved by adding additional cross-linking agents which react with the heterocyclic group of the co-polymerized monomer. Epoxy resins were found suitable; apart from the commercial epoxy resins a polymer can also be used which, according to the present invention has been co-polymerized with a small amount of acrylate and/or methacrylate monomer with epoxy groups. Furthermore, polybasic carboxylic acids, e.g. benzene tricarboxylic acid, adipic acid, maleic acid and itaconic acid, have proved to be suitable and to effect a further improvement of the adhesion properties.

Preparation of the plastisols according to the present invention can also be effected in that two or more acrylate or methacrylate polymers which meet the requirements of the invention are blended with each other. For example, a methylmethacrylate homopolymer can be blended with a methylmethacrylate copolymer or with a copolymer which has been further modified by copolymerization with a heterocyclic compound. In this manner, particularly favourable rheological properties can be obtained.

It is also possible to blend copolymers containing groups which react with each other. The above-described combination of copolymers with epoxy groups and of copolymers with heterocyclic groups is one example for this method.

The plastisols according to the invention can be processed in conventional manner dependent on the particular viscosity, for example by applying with a float, coating with a brush, applying with a paint gun, spraying with an atomiser and air, spraying by high pressure (without air), scraping on, calendering, pouring or immersing.

Finally, to form the plastigel the plastisols must be gelled. For this purpose temperatures between about 70° and 240° C. are used, dependent on the plastisol composition and the particular working conditions. The necessary gelling time is between two minutes and two hours. The necessary heating can take place, for example, by hot air, metal pipes, infra-red rays, high frequency heating, etc.

The plastisols according to the invention are particularly suitable as abrasion and corrosion inhibitors for steel sheets, for example as underbody-protection for automobiles, trucks and buses. The plastisols can also be used for seam seals for levelling out folding systems, as metal adhesives, coating compounds, spot welding compounds, expanding pastes, sealing agents for spot welded sheets and for sealing doubleflanged seams. They can also be used for impregnating and coating textiles and similar substrates such as tarpaulins, artificial leather, floor coverings, carpet backings, packaging materials, conveyor belts and driving belts. Using the immersion process, it is possible to produce hollow bodies, gloves, boots, finger stalls etc. The plastisols are also suitable as seals for bottle caps and folding seams, as plastic seals for air and oil filters, for extrusion and injection moulding highly elastic sections and items such as sealing strips and packaging cords, trays, technical components and for rolling foils and strips. If appropriate plasticizers and additives are used, the plastisols according to the invention are also suitable for packing foodstuffs because there are no objections to methylmethacrylate.

The following examples are provided to illustrate the invention. All formulations are given in parts by weight unless otherwise stated.

EXAMPLES 1 TO 15

Table 1 gives the results of 15 Examples. In Examples 1, 2, 7, 11 and 12 the plasticizer used was unsuitable for the particular polymer due to inadequate compatibility. In Examples 5, 9, 13 and 14 the value of 3.0 for the viscosity number was exceeded when using the indicated plasticizer, so that these combinations are also unsuitable. However, excellent results were obtained with the polymer/plasticizer combinations of Examples 3, 4, 6, 8, 10 and 15, wherein the plasticizer satisfied both criteria, i.e. it was completely compatible with the polymer and led to a viscosity number $V_{8/0}$ of less than 3.0.

Table 1

| Example | Parts by weight of polymer | $T_g$ in °C. | Particle diameter in microns | Parts by weight of plasticizer | Compatibility | Viscosity in cP immediately | Viscosity in cP after 8 days | $V_{8/0}$ | Elasticity |
|---|---|---|---|---|---|---|---|---|---|
| 1 | 50 PMMA | 105 | 30 | 50 DOP | bad | 910 | 990 | 1.09 | good |
| 2 | " | " | " | 50 DIBP | moderate | 720 | 1180 | 1.64 | good |
| 3 | " | " | " | 50 TKP | good | 2630 | 3070 | 1.17 | very good |
| 4 | " | " | " | 50 DPGB | good | 3450 | 3770 | 1.01 | very good |
| 5 | 50 MMA/BMA 85/15 | 89 | 2 | 50 DIBP | good | 2900 | solid | ∞ | good |
| 6 | " | " | " | 50 TKP | good | 9050 | 21000 | 2.32 | very good |
| 7 | " | " | " | 50 DOP | moderate | 4850 | 7300 | 1.51 | good |
| 8 | " | " | " | 50 DBT | good | 2870 | 6850 | 2.39 | very good |
| 9 | 50 MMA/BMA 50/50 | 56 | 50 | 50 DIBP | good | 8200 | solid | ∞ | very good |
| 10 | " | " | " | 50 DOP | good | 15900 | 35000 | 2.20 | very good |
| 11 | " | " | " | 50 DOA | moderate | 1150 | 2400 | 2.09 | good |
| 12 | " | " | " | 50 TEHM | moderate | 13600 | 13400 | 0.98 | hard, elastic |
| 13 | 50 MMA/BMA 30/70 | 40 | 240 | 50 DIBP | good | 5250 | solid | ∞ | soft, tacky |
| 14 | " | " | " | 50 DOP | good | 32750 | solid | ∞ | very good |
| 15 | " | " | " | 50 TEHM | good | 18100 | 14000 | 0.77 | good |

BMA - n-butylmethacrylate
DPGB - dipropyleneglycol-dibenzoate
DOP - dioctyl-phthalate
DBT - dibenzyl-toluene
PMMA - polymethylmethacrylate
DOA - dioctyl-adipate
DIBP - diisobutyl-phthalate
TEHM - tri(ethylhexyl)mellitate
TNP - tricresyl-phosphate
MMA - Methylmethacrylate

EXAMPLE 16

The following mixture is homogenized with a stirrer and applied with a doctor blade to a degreased steel sheet:

30 parts PMMA (30 microns)
30 parts butylbenzyl-phthalate
36 parts chalk
3 parts triethyleneglycol-dimethacrylate
0.3 parts tert.-butylperbenzoate If this mixture is gelled for 20 minutes at 170° C., a tough strongly adhering film is obtained which has good anti-corrosive properties.

EXAMPLE 17

30 parts copolymer (MMA/BMA 50/50) (50 microns)
30 parts dinonyl-phthalate
40 parts chalk
5 parts resorcinol resin (Rousselot RH 74-01)

This mixture was tested as a metal adhesive by gelling it at 170° C. between two metal plates of (a) steel and (b) aluminium. The subsequent tearing test revealed a tensile strength of (a) 52 kg/cm$^2$ and (b) 42 kg/cm$^2$ (5 cm$^2$ bonding area and 0.3 mm coating thickness). However, if in place of the 50 microns copolymer, a copolymer with an average particle size of 500 microns is used, a tearing value of only 3 kg/cm$^2$ is obtained.

EXAMPLE 18

24 parts MMA/BMA 85/15 (2 microns)
33 parts dibenzyl-toluene
40 parts chalk
3 parts azodicarbonamide This mixture gelled in 15 minutes at 170° C. and formed a highly elastic solid foam with 100% foam expansion.

EXAMPLE 19

20 parts PMMA (100%) (particle size 30 microns)
30 parts butylbenzyl-phthalate
45 parts chalk
5 parts resorcinol resin (Rousselot RH 74-01)

This highly viscous substance was suitable as a sealing compound for metal welding seams in the automobile and refrigerator industry. After baking at 180° C. for 15 minutes the substance adhered well to polished metal sheets and can be easily lacquered.

EXAMPLE 20

If a polymer plasticizer (urea/formaldehyde plasticizer resin sold as Plastigen) is used the following comparison is obtained with a polymer:plasticizer mixing ratio of 1:1.

Table 2

| Polymer | Particle size microns | Viscosity in cP immediately | after 8 days | Compatibility | Elasticity |
|---|---|---|---|---|---|
| 100% PMMA | 30 | 22000 | 16000 | good | hard |
| MMA/BMA 85/15 | 2 | 163000 | 218000 | good | hard, tough |
| MMA/BMA 50/50 | 60 | 23250 | 22250 | good | elastic |

EXAMPLE 21 (comparison)

Table 3 shows the thermal stability of an acrylic plastisol as compared with a PVC-plastisol with a baking cycle of 30 minutes at 150° C.

Table 3

| | | 1 | 2 |
|---|---|---|---|
| Emulsion PVC, K-value 74 (2 microns) | | 20 | |
| PMMA (30 microns) | | | 20 |
| Chalk | | 45 | 45 |
| Butylbenzylphthalate | | 35 | 35 |
| Viscosity in cP | immediately | 36000 | 52500 |
| | after 10 days | 21000 | 18000 |
| | $V_{10/0}$ | 0.58 | 0.34 |
| Cold elasticity | −40° C. | ++ | ++ |
| Discolouration | 120° C. | slight | slight |
| after 14 days at | 150° C. | black | slight |
| Abrasion (mm/min) after 14 days storage at | amb temp. | 0.016 | 0.045 |
| | 120° C. | 0.039 | 0.390 |
| | 150° C. | 1.280 | 0.220 |

The Table shows that after 14 days at 150° C. the PVC-plastigel had completely discoloured (decomposed) and that the abrasion values in a sand-blasting device (with corundum in place of sand) rose 80 times in the case of PVC, whereas in the case of the acrylic plastigel the abrasion values, although not originally especially good, only rose by a maximum of 25 times.

EXAMPLE 22 (comparison)

On comparing the following mixtures:
25 parts PVC (paste type, emulsion-polymerized, K value 74, 2 microns)
40 parts chalk
5 parts iron oxide (magn.)
27 parts DOP
3 parts triethyleneglycol-dimethacrylate
0.3 parts tert-butylperbenzoate
and the same mixture with
25 parts copolymer MMA/BMA 50/50 (50 microns particle diameter)
in place of PVC by coating them between two overlapping steel sheets and then joining the two sheets by spot welding, in the case of the PVC decomposition and hydrogen chloride formation occurs, whilst when left standing in air there is pronounced corrosion at the points where PVC-decomposition took place. This was not observed in the case of the methacrylate plastisol.

EXAMPLE 23 (comparison)

On gelling four plastisols
(a) 60 parts PVC (as in Example 22)
 40 parts DOP
(b) 60 parts PVC (as in Example 22)
 40 parts DBP
(c) 60 parts MMA/BMA 50/50 (50 microns)
 40 parts DOP
(d) 60 parts PMMA (30 microns)
 40 parts DBP
for 10 minutes at 200° C. they gelled to form a transparent film, but the PVC is always discoloured yellow to brown, whereas the acrylic resin remains colourless.

EXAMPLE 24 (comparison)

On gelling together the following components
(a) 30 parts PVC (as in Example 22)
 30 parts DOP
 20 parts chalk
 20 parts barite
(b) 30 parts MMA/BMA 85/15 (2 microns) in place of PVC otherwise as a)

for 30 minutes at 70° C., in the case of (a) a crumbly substance is obtained and in the case of (b) a solid tough film.

EXAMPLES 25 TO 28

For the preparation of the following plastisols in each case a copolymer was used which was polymerized with 1% by weight of a methacrylate monomer with a functional group. The plastisols obtained in this manner were tested for their adhesion properties using the method described in Example 17. The results compiled in the attached table 4 show that excellent adhesion values were obtained.

Table 4

| Example | Parts by Weight Polymer | Parts by weight Plasticizer | Parts by weight Filler | Bonding Strength in kg/cm$^2$ | Substrate |
|---|---|---|---|---|---|
| 25 | 50 MMA/BMA/ methacrylic acid (84:15:1) | 50 DBT | | 25 | degreased metal sheet |
| 26 | 20 MMA/BMA/ methacrylic acid (84:15:1) | 45 DBT | 35 chalk | 4.2 | primed metal sheet |
| 27 | 50 MMA/BMA/ glycidyl methacrylate (84:15:1) | 50 DBT | | 7,2 | untreated metal sheet |
| 28 | 50 MMA/BMA/ dimethyl amino ethyl methacrylate (84:15:1) | 50 DBT | | Film cannot be removed | Smooth Metal sheet |

EXAMPLE 29

(a) A plastisol was prepared from 50 parts by weight of a copolymer from methylmethacrylate and n-butyl-methacrylate (MMA/BMA 85:15; particle size approximately 2 microns) and 50 parts of dibenzyl toluene.

This plastisol was tested as metal-to-metal adhesive by applying it to two degreased metal sheets (bonding area 5 cm$^2$ and 0.3 mm layer thickness) and gelling it for 30 minutes at 180° C. The subsequent tear-off test (tearing speed: 100 mm per minute) did not yield a bonding strength value.

(b) The test was repeated using 50 parts by weight of a terpolymer which was copolymerized with 1 part by weight of N-vinyl imidazole (MMA/BMA/vinyl imidazole 84:15:1). Under otherwise unaltered conditions a bonding strength value of 13 kg/cm$^2$ was now obtained.

When the above plastisol, with a content of N-vinyl imidazole, according to the invention was used for the bonding of test sheets which had been electro-coated with a dip primer as it is used in the automotive industry a bonding strength value of 28 kg/cm$^2$ was obtained.

EXAMPLE 30

A further plastisol was prepared from 20 parts by weight of copolymer (MMA/BMA/N-vinyl imidazole 84:15:1), 35 parts by weight of chalk and 45 parts by weight of dibenzyl toluene. Upon gelling for 30 minutes at 180° C. on an EC primed metal sheet a bonding strength value of 11 kg/cm$^2$ was obtained.

The same plastisol surprisingly yielded bonding strength values of 14 and 12 kg/cm$^2$, respectively, when applied to degreased or slightly greasy metal sheets.

If, for comparative purposes, a methylmethacrylate homopolymer or a methylmethacrylate/butylmethacrylate copolymer is used which was not copolymerized with an adhesion promoter, no bonding strength value was obtained.

EXAMPLE 31

A plastisol was prepared from 50 parts by weight of a copolymer (MMA/N-vinyl imidazole 99:1), 30 parts by weight of chalk and 45 parts by weight of butylbenzyl-phthalate. Upon gelling for 30 minutes at 90° C. the plastisol coating on the primed metal sheet could not be removed.

If, however, the imidazole group is left out of the polymer no adhesion is obtained.

EXAMPLE 32

Following Example 29(b) a plastisol was prepared to which 1% by weight of one of the polybasic carboxylic acids listed below was added. The results show that the adhesion was considerably improved.

Table 5

| | Bonding Strength Values in kg/cm$^2$ after Gelling for 30 Minutes at | |
|---|---|---|
| Acid | 120° | 160° |
| None | 11.5 | 20.0 |
| Benzene tri-carboxylic acid | 20.2 | 28.0 |
| Adipic acid | 22.3 | 19.6 |
| Maleic acid | 34.2 | 30.7 |
| Itaconic acid | 27.8 | 25.3 |

EXAMPLE 33

A plastisol was prepared from the following ingredients:
100 parts poly(methyl methacrylate), 100%
85 parts acetyl tributyl citrate
5 parts titanium dioxide
5 parts zinc stearate The plastisol thus prepared was lined into the peripheral annular channel of lug caps by means of conventional lining machinery and the lined material was fluxed for one minute at 350° F. (177° C.).

The resulting gasketed lug caps were tested for sealing ability by determining their vacuum retention performance with the following procedure: A jar is filled with boiling water to one half inch from its top. A lug cap is sealed on with 35 inch pound (0.40 mkg) torque. The resulting assembly is cooled to room temperature and kept for one week. A vacuum reading is then obtained by means of a vacuum gauge. After removal of the cap, the compressed gasket thickness is measured.

All jars tested with lug caps gasketed with the above composition held a vacuum satisfactorily. Gasket thicknesses ranging from 20 to 35 mils (0.5 to 0.9 mm) were acceptable.

EXAMPLE 34

A plastisol was prepared with the following ingredients:
100 parts poly(methyl methacrylate), 100%
120 parts acetyl tributyl citrate
5 parts titanium dioxide
5 parts zinc stearate
4 parts azobisformamide
1.5 parts Lightweight silica (Cab-O-Sil ®)

This composition was lined into a wide-mouth jar closure (83 mm diameter) by conventional means. The lining was fluxed for 1.5 minute at 350° F. (177° C.).

The caps thus obtained were applied to jars with a 32 inch pound (0.36 mkg) torque and kept at room temperature for 24 hours. They were then placed on a stacker for one week, being subjected in the process to a net load of 128 lbs (57 kg) on each cap and jar assembly. The jars were then removed, kept at room temperature for 24 hours and placed in a cold room for two days. Vacuum was determined at 40° F. (4° C.) by means of a gauge. Nine out of ten jars tested held 40 mmHg, an acceptable performance.

I claim:
1. A plastisol consisting essentially of
   (a) 100 weight parts of solid particles of an organic polymer having units derived from a monomer selected from t-butylacrylate or methyl, ethyl, n-propyl, isopropyl, isobutyl, sec-butyl, t-butyl or cyclohexyl methacrylate, and copolymers of at least one said monomer with at least one comonomer selected from methacrylates of alphatic $C_2$ to $C_{10}$ alcohols, acrylates of $C_1$ to $C_{10}$ alcohols, styrene and a-methyl-styrene, whereby the polymer has an average particle size of 0.1 to 500 microns, a glass transition temperature above 35° C. and an average degree of polymerization of more than 400,
   (b) 0.1 to 50 parts by weight of an adhesion promoter, said adhesion promoter selected from triethyleneglycol dimethylacrylate, trimethylol trimethylacrylate combined with peroxides, amino silanes and mixtures thereof, and
   (c) 30 to 1000 parts of an organic liquid plasticizer which is sufficiently compatible with the polymer that at least 8 days after gelling of said plastisol the plasticizer does not exude from said plastisol, said plasticizer further being effective to provide the plastisol with a viscosity index $V_{8/0}$ of less than 3.0; the average particle size of polymer (a) being related to its glass transition temperature so as to lie within the triangle XYZ of the accompanying drawing, said plastisol further being in the form of a liquid or paste-like dispersion of polymer particles in plasticizer capable of being gelled by heating to a temperature between about 70° and 240° C.
2. In a plastisol, in which solid particles of an organic polymer component (a) are dispersed in an organic liquid component (b), which serves as a compatible plasticizer for the organic polymer, in a proportion effective to form a viscous dispersion having a liquid or paste-like appearance capable of being gelled by heating, the improvement in which the organic polymer component consists essentially of units derived from
   (i) at least one monomer selected from: t-butyl acrylate, a $C_{1-4}$ alkyl methacrylate and cyclohexyl methacrylate, or
   (ii) at least one of the above monomers and at least one comonomer selected from: methacrylates of aliphatic $C_2$ to $C_{10}$ alcohols, acrylates of aliphatic $C_1$ to $C_{10}$ alcohols, styrene and alphamethylstyrene, and, as an adhesion promoter comonomer in said organic polymer component,
   (iii) at least one adhesion promoter comonomer selected from acrylate monomer with free functional groups selected from the group consisting of carboxyl, hydroxyl, epoxy and amino functional groups, methacrylate monomer with free functional groups selected from the group consisting of carboxyl, hydroxyl, epoxy and amino functional groups, copolymerizable heterocyclic vinyl compound of the general formula in which n is equal to 0 or 1, $R_1$ is a hydrogen atom, a linear or branched chain alkyl group with 1 to 4 carbon atoms or a phenyl group and $R_2$ is a group of the formulae in which $R_3$ is a heterocyclic group having at least one ring with
at least one nitrogen atom in the ring,
the polymer having a glass transition temperature of above 35° C. and an average degree of polymerization of more than 400, and the average particle size of the polymer in the plastisol being from 0.1 to 500 microns; said plasticizer being present in an amount of from 30 to 1000 parts per 100 parts by weight of said polymer and being sufficiently compatible that at least 8 days after the gelling of said plastisol, the plasticizer does not exude from said plastisol, said plasticizer moreover being effective to provide the plastisol with a viscosity index $V_{8/0}$ of less than 3.0.
3. The plastisol according to claim 2 wherein the free functional groups are selected from free carboxyl groups, hydroxyl groups, epoxy groups, amino groups and mixtures thereof.
4. The plastisol according to claim 2 wherein the adhesion promoter monomer is selected from free acrylic acid, free methacrylic acid, esters of acrylic acid with lower aliphatic oxy, epoxy or amino alcohols, esters of methacrylic acid with lower aliphatic oxy, epoxy or amino alcohols and mixtures thereof.
5. The plastisol according to claim 2 wherein the polymer contains up to 10% by weight of units derived from at least one comonomer containing a heterocyclic group having at least one nitrogen atom in the heterocyclic ring.
6. A plastisol according to claim 2 in which the organic polymer component contains 0.2 to 3.0% by weight of the heterocyclic group-containing comonomer.
7. A container closure containing therein a plastisol claimed in claim 1 in an amount effective after curing to provide a sealing gasket for said closure.

8. A article comprising a metal substrate coated with a plastisol claimed in claim 2.

9. An article according to claim 6 in the form of a container closure sealing gasket.

10. A homogeneous elastic solid gel in the form of a container closure sealing gasket formed from a plastisol consisting essentially of solid particles of average particle size 0.1 to 500 microns of an organic polymer having a glass transition temperature above 35° C. and consisting of 40–100% of units derived from methyl methacrylate, 0–60% of units derived from a comonomer selected from alkyl acrylates having 1–4 carbon atoms in the alkyl portion and alkyl methacrylates having 2–4 carbon atoms in the alkyl portion, 0–3% of units derived from a second comonomer selected from methacrylic and acrylic compounds having at least one hydroxyl, epoxy, amino or carboxylic acid group, and 0.1–10% of units derived from a third comonomer adhesion promoter which is a heterocyclic vinyl compound of the general formula $$CH_2=\overset{R_1}{\underset{|}{C}}-(CH_2)_n-R_2$$

in which n is 0 or 1, $R_1$ is selected from hydrogen, alkyl of 1 to 4 carbon atoms and phenyl and $R_2$ is selected from $$-\underset{\underset{O}{\|}}{C}-OR_3,$$

—$COR_3$ and —$R_3$ in which $R_3$ is a heterocyclic group having at least one ring containing a nitrogen atom, all percentages being by weight, the degree of polymerization of the polymer being more than 400, based on methyl methacrylate and the first comonomer when used, dispersed in an amount of compatible plasticizer effective to form a viscous plastisol the viscosity of which does not increase by more than 300% within 8 days of preparation; said amount being in the range of from 30 to 1000 parts per 100 parts by weight of said polymer, said plasticizer being sufficiently compatible that at least 8 days after the gelling of said plastisols, the plasticizer does not exude from said plastisol.

11. A plastisol, comprising
(a) 100 weight parts of solid particles of average size 0.1 to 500 microns of an organic polymer consisting of units selected from the group consisting of
  (i) one or more monomers selected from the group consisting of t-butyl acrylate, a $C_{1-4}$ alkyl methacrylate and cyclohexyl methacrylate, and
  (ii) one or more of the above monomers and one or more comonomers selected from the group consisting of methacrylates of aliphatic $C_2$ to $C_{10}$ alcohols, acrylates of aliphatic $C_1$–$C_{10}$ alcohols, styrene and alpha-methyl styrene,
the said polymer including up to 3% by weight, based on the polymer, of units selected from the group consisting of an acrylic and methacrylic monomer having a hydroxyl, epoxy, amino or free carboxyl group, and 0.1–10% by weight of adhesion promoter units selected from the group consisting of one or more comonomers containing a heterocyclic group having at least one nitrogen atom in a heterocyclic ring, said polymer having a glass transition temperature of above 35° C. but not above 105° C. and an average degree of polymerization of more than 400, the average particle size of the polymer in the plastisol being being from 0.1 to 500 microns, and
(b) 30 to 1000 weight parts of an organic liquid component which serves as a compatible plasticizer for the organic polymer, to form a viscous dispersion having a liquid or paste-like appearance, and a viscosity number $V_{8/0}$ below 3.0.

12. The plastisol of claim 11 wherein the average particle size of the polymer is related to its glass transition temperature as to lie within the triangle XYZ of the accompanying drawing.

13. The plastisol of claim 11 wherein the plasticizer is selected from dioctyl phthalate, dibutyl phthalate or di(2-methoxyethyl)phthalate and the average particle size of the polymer is related to its glass transition temperature so as to lie within the triangle ABC, DEF or GYH, respectively, of the accompanying drawing.

14. The plastisol of claim 11 which contains up to 700 weight parts of inert filler.

15. The plastisol of claim 13 in which monomer (i) is methyl methacrylate.

16. The plastisol of claim 11 wherein the polymer contains units of the said heterocyclic group-containing comonomer and the said comonomer is a heterocyclic vinyl compound of the general formula:

$$CH_2=\overset{R_1}{\underset{|}{C}}-(CH_2)_n-R_2$$

in which n is equal to 0 or 1, and $R_1$ is a hydrogen atom, a linear or branched alkyl group with 1 to 4 carbon atoms or a phenyl group, and $R_2$ is a group selected from the groups of the formula:

$$-\overset{\overset{O}{\|}}{C}-\ OR_3, \quad -COR_3, \quad or \quad -R_3$$

in which $R_3$ is a heterocyclic group having one or more rings, at least one nitrogen atom being present in at least one ring.

17. The plastisol of claim 11 wherein the polymer contains units of a said heterocyclic group-containing comonomer in a proportion of 0.2 to 3.0% by weight of the polymer.

18. Container closures having therein a sealing gasket produced by shaping and gelling the plastisol of claim 11.

* * * * *